United States Patent [11] 3,599,670

[72] Inventors John Raymond Gurner;
 Leslie Arthur Henman, both of Ilford,
 England
[21] Appl. No. 689,898
[22] Filed Dec. 12, 1967
[45] Patented Aug. 17, 1971
[73] Assignee The Plessey Company Limited
 Ilford, England
[32] Priority Dec. 14, 1966
[33] Great Britain
[31] 55947

[54] FLUID COUPLINGS
 5 Claims, 3 Drawing Figs.
[52] U.S. Cl. .................................................... 137/614,
 137/614.06, 137/456, 251/149
[51] Int. Cl. .................................................... F16l 29/00,
 F16l 37/28
[50] Field of Search .......................................... 137/614,
 614.1, 614.06, 456, 459, 460, 461; 251/149.1,
 149.9, 149.8, 347, 348; 166/224

[56] References Cited
UNITED STATES PATENTS
1,120,661 12/1914 Artigue ......................... 137/614
3,359,015 12/1967 Zahuranec ..................... 251/149.8
3,348,575 10/1967 Simak ........................... 137/614.06
FOREIGN PATENTS
1,023,477 3/1966 Great Britain ................. 137/614.06
Primary Examiner—Laverne D. Geiger
Assistant Examiner—William H. Wright
Attorney—Scrivener, Parker, Scrivener and Clarke ABSTRACT: A fluid coupling comprises two separable parts, one of the parts including normally closed valve means which may be opened by valve actuating means carried on the other part when the two parts are coupled together, the actuating means being controllable remotely from the coupling. The valve means may be actuated remotely via a flexible hose connected to the part including the valve actuating means, and the same hose may be used for passing fluid through the coupling at a maximum rate determined by the design of the coupling. If the maximum rate is exceeded for example by leakage from the hose the coupling valve will close and prevent further flow.

PATENTED AUG 17 1971  3,599,670

INVENTOR

BY

ATTORNEY

FLUID COUPLINGS

This invention relates to fluid couplings. It relates specifically to the provision of a fluid coupling including a valve which enables a flow of fluid through the coupling to be controlled from a remote point.

According to one feature of the invention a fluid coupling comprises two separable members, a valve member including normally closed valve means for controlling a flow of fluid through the coupling, and a valve actuating member including valve actuating means for actuating the valve in the valve member of the coupling when the two members are coupled together, the valve actuating means being controllable by means remote from the coupling.

According to a further feature of the invention the valve actuating member comprises valve actuating means including a plunger which is movable by a piston. The piston may have two faces such that it will be movable in response to a difference in pressure between a pressure line to which the valve actuating member may be connected and the pressure surface which is to couple with the valve member of the coupling. The two faces of the piston may be of different areas such that balancing of the piston will take place when a predetermined ratio between the two pressures exists.

The piston may include a through bore such that when the plunger has actuated the valve in the opposite part of the coupling a passage of fluid may take place through such bore. The through bore may include a construction such that if the rate of flow of such fluid exceeds a predetermined value, an increase of pressure will occur at the constriction and this will tend to move the piston and to close the valve in the valve member.

The valve actuating member may also include a nonreturn valve to prevent any quantity of fluid leaking out of the valve actuating member of the coupling and a pressure line connected thereto when the coupling members have been uncoupled from one another. The nonreturn valve may be in the piston.

The valve actuating member of the coupling may include a movable sleeve incorporating a ball locking device enabling the valve actuating member to be locked to the valve member of the coupling. The movable sleeve may be spring-loaded so that it will normally rest in a position on its member of the coupling that it would occupy if the two members were coupled together. The movable sleeve may be linked mechanically to the piston such that when the piston is in a position to admit a flow of fluid through the coupling the sleeve will be held so as to lock the two members together. The sleeve may thus only be withdrawn to unlock the two members when the piston is moved to a position where the valve is no longer actuated.

According to yet a further feature of the invention, a fluid coupling comprises a valve member having normally closed valve means including a spring-loaded ball valve. When moved away from a ball valve seating the ball may pass through a passage having walls which closely fit around the ball before the ball can be moved to a position where the valve can pass a normal flow of fluid.

By way of example an embodiment of the invention will be described with reference to the drawing accompanying the specification, in which FIG. 1 shows an axial cross section of the coupling in which both members are coupled together and are in condition for the passage of fluid through the coupling.

Figure 1:
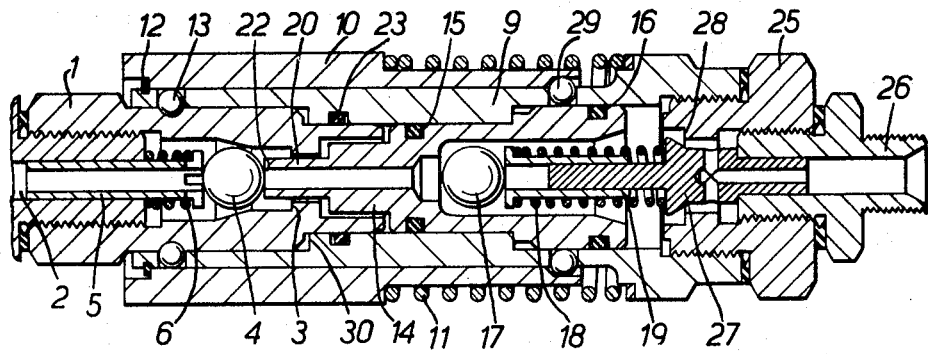
Figure 2:
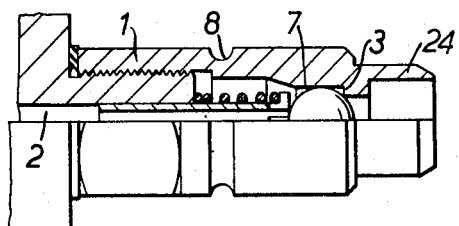
FIG. 2 is a partial cross section of the valve member of the coupling.
Figure 3:
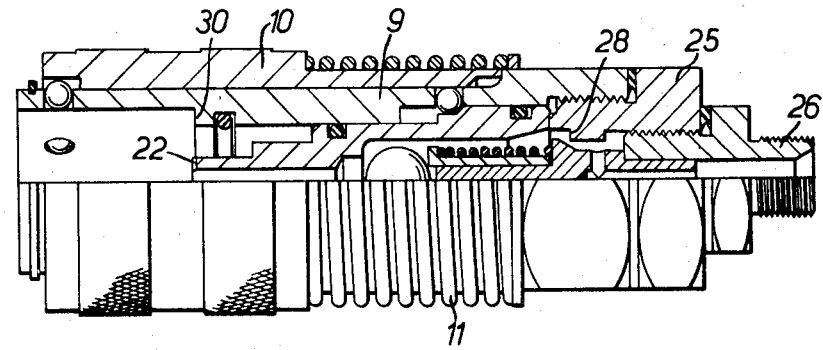
FIG. 3 is a similar view of the valve actuating member of the coupling.

The embodiment of the invention about to be described was designed to allow a flexible pipe to be connected or disconnected from a fixed point on a pressurized fluid source without risk to an operator. The risk in this case could be injury due to the temperature or velocity of the fluid should it escape in the presence of the operator, or there would be a health hazard if the fluid were for example radioactive or toxic gas. I desired the coupling could of course be constructed in a different way so that for instance both members might be carried on flexible pipes.

A valve member of the coupling comprises a valve body 1 which is connected to a source 2 of pressurized fluid from which a quantity is to be withdrawn through the coupling. The valve body 1 includes a seat 3 against which a ball 4 is normally pressed by a spring support member 5 and a spring 6. When the ball 4 is moved away from the seat the ball passes first through a narrow bore 7 in he body of the coupling member and this bore is of such diameter that it will closely fit the ball and thus almost prevent any flow of fluid around the ball. Further movement of the ball 4 away from the seat will cause the ball to enter a wider passage which will permit a normal flow of fluid round the ball without significant pressure loss. The valve body 1 also includes a semicircular groove 8 by means of which a sleeve on a valve actuating member of the coupling may lock both members of the coupling together.

The valve actuating member of the coupling comprises a base 9 upon which is mounted a sleeve 10 that is biased by means of a spring 11 towards the left-hand side of the drawing. The sleeve 10 is retained on the base 9 by means of a circlip 12. When the sleeve 10 is moved fully to the left it causes closure of a left-hand ball locking device 13. When the two members of the coupling are fitted together this ball locking device 13 closes into the semicircular groove 8 of the valve member of the coupling and prevents the two members from being separated.

A movable piston 14 is mounted concentrically within the base 9 of the valve actuating member. The piston is shaped so as to have two diameters which are sealed by slidable sealing devices to appropriate walls of the base 9. The smaller diameter of the piston is sealed by the seal 15 and the larger diameter by the seal 16 to the wall of the body. The region between the two seals is open to atmospheric pressure by means of holes which are not shown in the drawing.

A ball valve 17 is mounted within the piston 14, and is normally held in contact with a seat machined in the piston by a light spring 18 acting through a spring support member 19. The purpose of this ball valve 17 is to prevent any quantity of fluid leaking out of the valve actuating member of the coupling and any pressure line connected thereto when the two coupling members have been uncoupled from one another.

A projection from the left-hand side of the piston 14 forms a plunger 20 which is of such diameter as to be insertable in a bore of the valve member of the coupling after the two members have been mated together. The plunger 20 is thus able to push the ball 4 away from the seat 3 in the valve member of the coupling and permit normal flow of fluid to take place through the coupling. This fluid passes through a passage in the plunger entering the passage through a small slot 22 at the end of the plunger which in conjunction with part of the ball surface acts as a construction controlling the rate of fluid flow through the coupling.

A further seal 23 is mounted within the base 9 and this operates in conjunction with a skirt 24 on the body 1 to prevent escape of fluid from between the two parts of the coupling when the two members are mated together.

A screwed top cap 25 is fitted to the base 9 and a connecting union 26 is screwed into the top cap 25. The connecting union 26 is coupled to a flexible hose (not shown) which may be connected to apparatus for pressurizing and exhausting the hose as well as for receiving fluid passed into the hose through the coupling. A valve 27 is located at the base of the connecting union 26 by means of a press fitted joint. This valve 27 is fitted after the connecting union 26 has been screwed into the top cap 25 and is mounted concentrically but out of contact with a valve seat 28 which is machined in the top cap 25.

Movement of the piston 14 effects actuation of a right-hand ball locking device 29 which is located towards a right-hand end of the sleeve 10. The arrangement is such that when the piston 14 is moved to the left and is thus in a position to actuate the valve in the valve part of the coupling, the sleeve 10 will be locked in the position shown in FIG. 1 such that the two halves of the coupling are locked together. The right-hand ball locking device 29 can be freed by movement of the piston 14 to the right and this then permits sleeve 10 to be moved against its spring-loading and the two parts of the coupling may be disconnected.

In operation of the coupling the two members are connected by adopting the following procedure; the spring-loaded sleeve 10 of the valve actuating member of the coupling is pulled back against the spring load to free the left-hand ball locking device 13; the valve actuating member is then pushed onto the valve member of the coupling until a shoulder 30 on the valve actuating member abuts up against a corresponding shoulder on the valve member of the coupling, this position effects alignment of the left-hand ball locking device 13 with the semicircular groove 8 of the valve member of the coupling on releasing the sleeve 10 the two coupling members are coupled together and a fluidtight connection is formed by contact of the seal 23 with the machined skirt 24 on the valve member.

Fluid under pressure is then admitted to the coupling from the right-hand side thereof via the flexible hose connected to the valve actuating member. This is achieved by opening a valve to a fluid pressure supply in control apparatus remote from the coupling and pressurizing the flexible hose connected to the valve actuating member. The fluid pressure required to open the ball valve in the valve member of the coupling may be lower than the pressure normally present at the source 2 of fluid by a factor which is dependent on the ratio of the two diameters of the piston 14. When pressure is admitted to the valve actuating member of the coupling, the piston 14 is moved into contact with the ball 4 of the valve member. When the thrust on the piston is sufficient to overcome the sealing force exerted on the ball 4 the ball valve will open and will permit flow from the source 2 of fluid through the passage in the plunger 20 and the piston 14. The rate of flow of fluid through the coupling is controllable by the control apparatus at the end of the hose linked to the valve actuating member of the coupling and the rate of flow of the source fluid through the coupling may thus be controlled by means independent of the coupling.

Under normal flow conditions, the fluid passes around the ball 4 of the valve member and through the small slot 22 in the passage of the plunger 20 and is thus subject to a pressure loss across the restriction which is relatively low at normal flow velocity. The restricted flow continues through the passage in the plunger, around the ball valve 17 passing across valve 27 and into the flexible hose from the connecting union 26.

Should conditions in the hose cause the flow to increase to a predetermined level above normal flow rate, the pressure difference across the slot 22 in the plunger will reach a value sufficient to cause a reverse thrust on the piston 14 and move it back into the valve actuating member of the coupling. The ball 4 in the valve member of the coupling will remain in contact with the plunger 20 and thus pass first into the close fitting narrow bore section 7 of the body 1 and finally into contact with the seat 3.

This feature will enable the coupling to be shut off from a remote point by bypassing a normal flow control device in the control apparatus, and will also shut off the coupling in the event of failure of the flexible hose or any part of the equipment being supplied with the source fluid. Thus a serious leak of fluid from the flexible hose will cause the rate of fluid flow through the coupling to increase and automatically shut off the ball valve 4.

A right-hand ball locking device 29 is positioned in relation to sleeve 10 and piston 14 in such fashion that the sleeve cannot be raised to release the valve actuating and valve member of the coupling while the piston 14 and ball 4 are in the flow operation conditions. On reverse movement of the piston 14 the ball locking device 13 is released just before the ball 4 contacts the seat 3 in body 1, but with the ball within the narrow bore 7 of the body. This feature ensures that the coupling halves cannot be separated while any significant flow or pressure of source fluid is present in the valve actuating member.

Should the ball 4 fail to move towards the seat 3 in the body 1 due to seizure or wedging in the bore of the body the continued reverse movement of piston 14 will open the slot 22 and expose the passage in the plunger to full pressure from the source 2 of fluid. This will cause the pressure difference across piston 14 to fall and the plunger will move back into contact with the ball 4, thus preventing release of the locking device 13.

The size of the fluid passage in the valve 27 are such that with maximum source pressure the flow of fluid cannot reach a value that will create sufficient pressure difference across the piston 14 when the main fluid in the passage is exposed in this way to maintain reverse movement.

In the event of failure of the coupling to shut off for reasons such as the conditions described above, the flexible hose on the connecting union 26 can be removed by unscrewing the union from the top cap 25. When these components have been separated the valve 27 will be moved into contact with valve seat 28, shutting off fluid flow well before final separation of the components is achieved. The press fitted shank of valve 27 will be forced out of the connecting union 26 during the separating process. In this condition the coupling is rendered safe but is unusable and a protective cap may be placed over it until a shut down of the main plant or unit providing the source 2 of fluid gives an opportunity for servicing or replacement of the coupling.

Use of the coupling of the invention has been found to be convenient in the development of a mobile fission product detection system for a nuclear reactor. This system is for use with a reactor operating with carbon dioxide coolant at a pressure of 600 p.s.i. and requires gas samples from 300 to 400 separate fuel channels to be connected to a trolley carrying test equipment. The trolley may be stationed at one of several positions around the reactor pile cap with a flexible extension hose for coupling the trolley to a number of channel sampling positions. The trolley can also be connected at the selected station with appropriate electrical services, a clean carbon dioxide pressure source and a reactor low pressure exhaust stack.

It is essential that the operator is not exposed to severe leakage of active gas when connecting the extension hose to any of the gas sampling positions and any damage to the extension hose or detection equipment resulting in such a leakage will automatically cause the valve in the coupling to close and isolate the connected fuel channel preventing any continuous escape of high-pressure gas.

All the sampling positions on the reactor are fitted with the valve members of the coupling and these are normally protected by an independent sealing cap. These sealing caps prevent a collective leakage of gas from exceeding the desired safe limits.

A valve actuating member of the coupling is fitted to the extension hose from the trolley and the end of this hose terminating at the trolley is fitted with a conventional self-sealing coupling attached to a suitable mating coupling linked to the trolley mounted detection equipment. The extension hose can be readily connected to the particular reactor channel required to be sampled and the safety features inherent in the design of both members of the coupling will then help to safeguard an operator from exposure to gas emerging at high temperature and pressure.

A particular embodiment of the coupling intended for use in this application was designed to have the following characteristics:

1. The valve in the coupling can only be opened by increasing pressure in an extension hose which may be done at a point remote from the coupling. The valve may be closed by reducing the pressure in the hose also from the remote point. The pressures required to operate the valve may be different from that available at the fluid supply source. The embodiment was designed with areas of piston faces in the ratio of about 3:1 so that a pressure of 200 p.s.i. in the hose was sufficient to open the valve when the pressure at the fluid source was 600 p.s.i.

2. The coupling was sensitive to the rate of flow and the valve in the coupling would close if the flow exceeded a predetermined value. This might happen in the case of failure of the extension hose or any equipment connected thereto. The normal flow rate in the example described was 0.002 pounds per second and if this increased to 0.008 pounds per second the coupling valve would close and prevent further flow of fluid.

3. In the event of failure of the valve in the valve member of the coupling to close due perhaps to seizure of the ball 4 the two members of the coupling would become locked together.

4. If failure of the valve caused locking of the coupling in this way there would still be provision for shutting off any fluid flow through the valve and this would permit removal of the extension hose from the coupling.

The foregoing description of an embodiment of the invention has been given by way of example only and a number of modifications may be made without departing from the scope of the invention. For instance the ball 4 of the valve could be replaced by an obturating member of conical shape.

What we claim is:

1. A fluid coupling comprising first and second separable coupling members, a normally closed valve contained in the first coupling member for controlling a flow of fluid through the coupling, a valve actuating member contained in the second coupling member and arranged to be axially movable therein when said members are coupled, the valve actuating member including a hollow plunger having an internal passage through which a fluid in passing through the coupling is conveyed, the valve actuating member being arranged to move to open the normally closed valve by applying a fluid under pressure to the end of the actuating member that is remote from said valve, and interlocking means for preventing the first and second coupling members from being decoupled until the applied pressure is reduced below a predetermined level.

2. A coupling according to claim 1, in which the second coupling member further comprises a normally open valve and a supply line coupling by means of which fluid is fed to said valve, it being arranged that the normally open valve is caused to close when the supply line coupling is disengaged from said second coupling member.

3. A coupling according to claim 1, in which said plunger is attached to a piston having faces of different areas and which is capable of being moved in response to a suitable pressure difference across said piston.

4. A coupling according to claim 1, in which said internal passage includes a portion defining a construction of predetermined size for enabling any excessive flow of a fluid passing through said coupling to be detected by a pressure rise upstream of such constriction.

5. A coupling according to claim 4 in which a part of said constriction is provided by a wall of said valve of the valve member.